United States Patent
Inada et al.

[15] 3,650,573
[45] Mar. 21, 1972

[54] ANTISKID BRAKE ASSEMBLY

[72] Inventors: Masmai Inada; Tatsuo Hayashi; Katuki Takayama, all of Kariya-shi, Japan

[73] Assignee: Aisin Seiki Company Limited

[22] Filed: Mar. 24, 1969

[21] Appl. No.: 809,853

[30] Foreign Application Priority Data

Mar. 22, 1968 Japan....................................43/18673
Oct. 11, 1968 Japan....................................43/74037

[52] U.S. Cl..........................303/21 F, 188/181 A, 303/6 C, 303/22 R, 303/61
[51] Int. Cl..........................B60t 8/04, B60t 8/22, B60t 8/26
[58] Field of Search ..............................303/21, 22, 61-63, 303/68-69, 6; 188/181; 60/54.5, 54.5 P

[56] References Cited

UNITED STATES PATENTS

| | | | |
|---|---|---|---|
| 3,414,334 | 12/1968 | Payne | 303/6 C |
| 3,453,029 | 7/1969 | Swanson | 303/6 C |
| 2,178,290 | 10/1939 | Sorensen | 303/21 |
| 3,093,422 | 6/1963 | Packer et al. | 303/21 |
| 3,153,559 | 10/1964 | Schaffer | 303/21 |
| 3,288,232 | 11/1966 | Shepherd | 303/21 |
| 3,415,578 | 12/1968 | Walker | 303/21 |
| 3,422,622 | 1/1969 | Arentoft et al. | 60/54.5 P |
| 3,479,094 | 11/1969 | Chouings | 303/21 |

Primary Examiner—Trygve M. Blix
Assistant Examiner—John J. McLaughlin
Attorney—Sughrue, Rothwell, Mion, Zinn & MacPeak

[57] ABSTRACT

This invention concerns an anti-skid type automotive vehicle wheel brake cylinder comprising a foot brake pedal, a pneumatic brake booster, a hydraulic master cylinder, a skid sensor, a hydraulic wheel cylinder for each of vehicle wheels and a pressure regulator for the control of hydraulic wheel cylinder pressure in response to an output from said skid sensor. The brake arrangement according to the present invention means are provided for making a selected pair, preferably the rear pair, of the vehicle wheels more liable to invite a skid of the selected wheel pair than the remaining wheels, preferably front wheel pair. The brake boosters is controlled in response to an output skid signal from said skid sensor in the skid suppressing sense and a cut-off valve is provided for the wheel brake cylinders for the remaining vehicle wheels, said cut-off valve being operated for cutting off the hydraulic pressure delivered from said master cylinder to the latter wheel brake cylinders in response to the skid output signal from said skid sensor.

8 Claims, 16 Drawing Figures

Patented March 21, 1972
3,650,573
5 Sheets-Sheet 1
FIG. 1
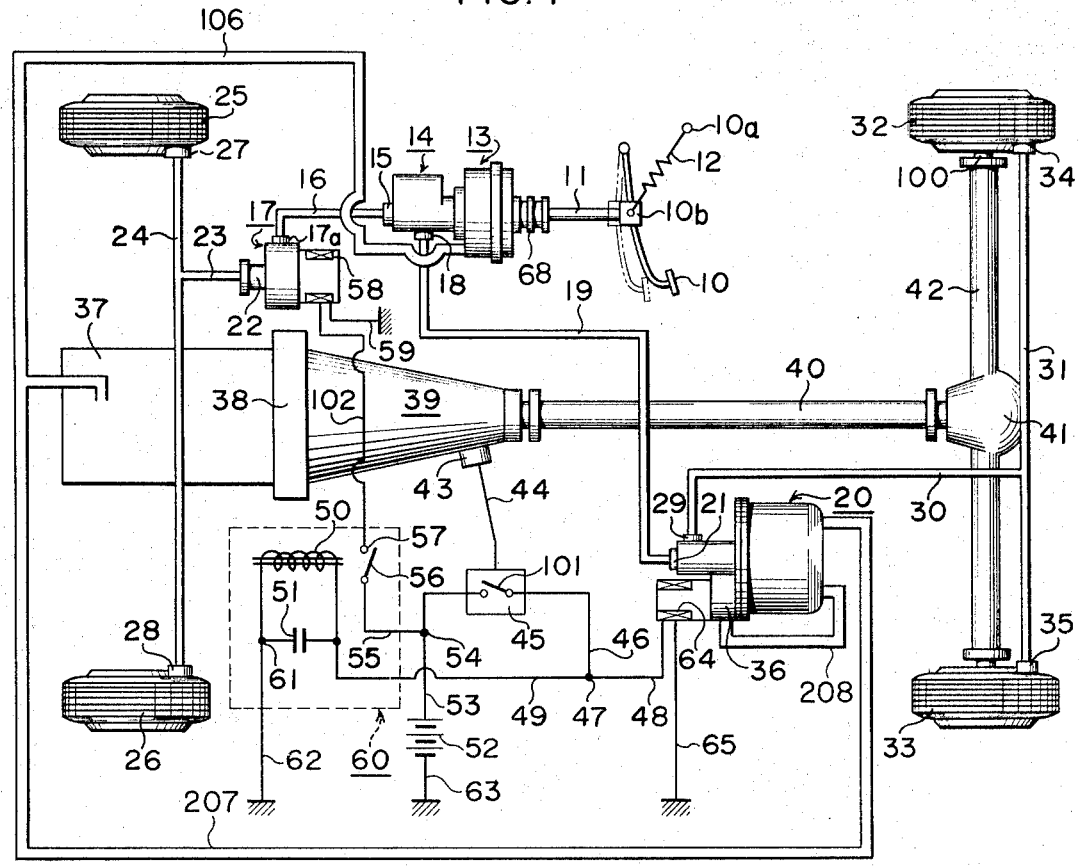
FIG. 16
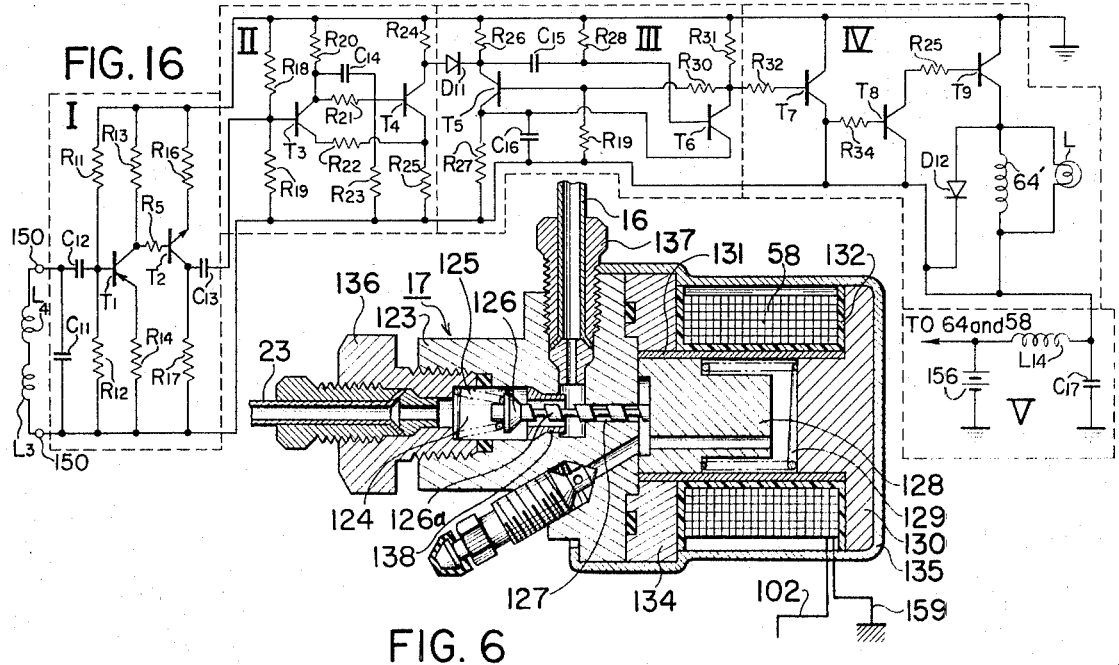
FIG. 6

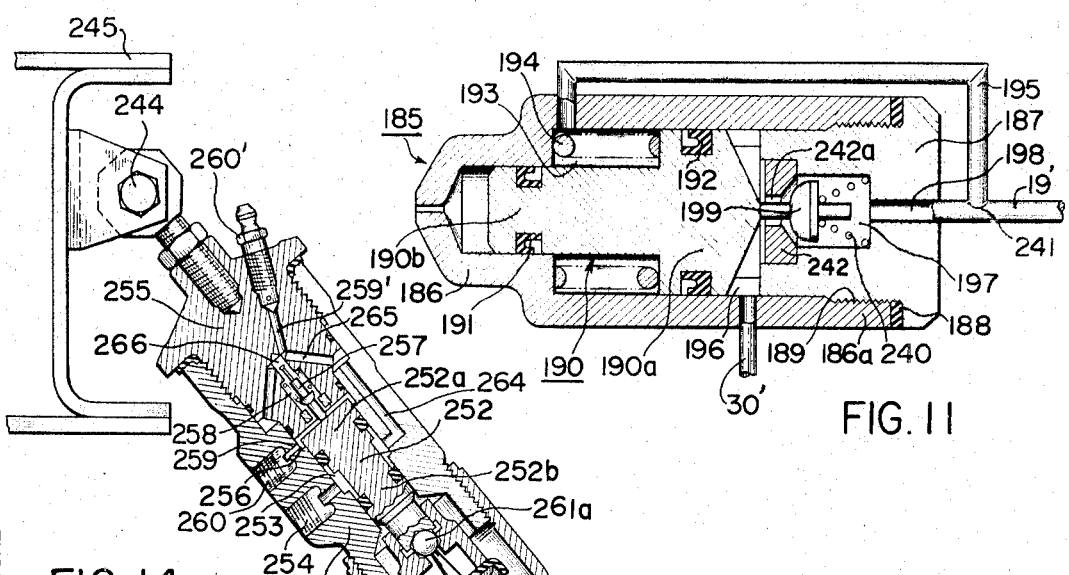
FIG. 11
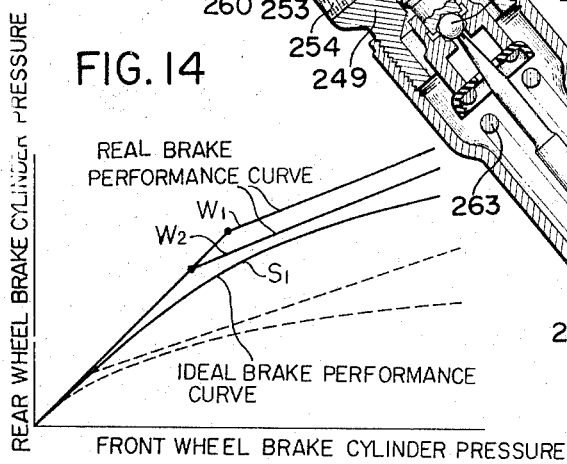
FIG. 14
REAR WHEEL BRAKE CYLINDER PRESSURE
REAL BRAKE PERFORMANCE CURVE
IDEAL BRAKE PERFORMANCE CURVE
FRONT WHEEL BRAKE CYLINDER PRESSURE
FIG. 12
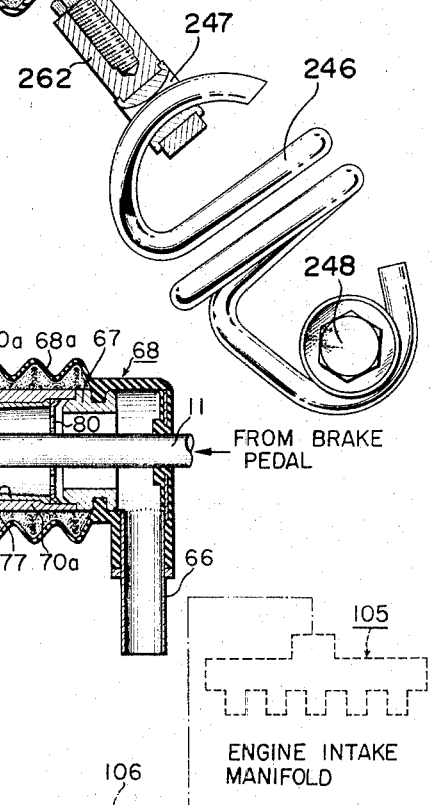
FIG. 2
TO MASTER PISTON
FROM BRAKE PEDAL
FROM ENGINE INTAKE MANIFOLD
ENGINE INTAKE MANIFOLD

ANTISKID BRAKE ASSEMBLY

This invention relates to improvements in and relating to the automotive brake system of the antiskid type for vehicle wheels, comprising a foot or the like operated brake actuating means such as a brake pedal, a preferably pneumatic booster, a hydraulic master cylinder, a wheel skid sensor, a hydraulic pressure reducing valve assembly controlled thereby, and a hydraulic cylinder provided for each of the vehicle wheels.

In the conventional antiskid type wheel brake system of the kind above referred to, when generally speaking, the antiskid operation is such that the hydraulic pressure supplied to the hydraulic wheel cylinder or cylinders of skidding or skidded wheels are reducingly controlled, while the hydraulic brake pressure supplied to the remaining vehicle wheels is simultaneously reduced. This kind of operation results in such drawbacks that the decelerating effect will be considerably and unfavorably reduced during the antiskid operation. Thus, the overall brake applying distance of the vehicle until it reaches a stop becomes considerably longer than the ideal brake distance and the personnel in the running vehicle will experience sudden and severe physical shocks during the braking period, on account of a broader variation range of the intentional deceleration for wheel braking. This will further invite a retardation in response by the brake booster on account of the necessarily increased capacity for temporary release of wheel brake pressure for avoiding dangerous wheel skids.

It is therefore the main object to provide an antiskid type automotive wheel brake system, capable of substantially obviating the aforementioned several conventional drawbacks.

In the antiskid type automotive brake system according to this invention, a selected pair of automotive wheels is braked with stronger hydraulic brake pressure supplied from the master cylinder to the corresponding wheel brake cylinders than that supplied to the respective wheel brake cylinders attributed to the remaining automotive wheels so that a skidding or impending locked condition of the selected wheel pair could be brought about earlier than that of the remaining wheels, and in response to a skid signal obtained from the skid sensor provided for the selected wheel pair, an air change-off valve is actuated so as to control the action of the brake booster in the skid suppressing sense for the front and rear wheel pairs. In response to said output signal from said skid sensor a cutoff valve provided for the remaining wheel pair is actuated for interrupting the hydraulic connection between said master cylinder and the respective hydraulic brake cylinder means for the remaining wheel pair so as to maintain the occasionally prevailing pressure in said brake cylinder means.

These and further objects, features and advantages of the invention will become more clear as the description proceeds by reference to the accompanying drawings constituting part of the present specification and representing by way of example several preferred embodiments of the invention.

In the drawings:

FIG. 1 is a schematic general arrangement of the first embodiment of the invention wherein however all the constituting parts are shown in their off-service position.

FIG. 2 is an enlarged axial sectional view of a pneumatic brake booster assembly schematically shown in FIG. 1.

FIG. 6 is an enlarged axial sectional view of a hydraulic cutoff valve assembly shown schematically in FIG. 1.

FIG. 11 is an enlarged axial sectional view of a hydraulic pressure control valve assembly shown schematically in a rectangular block with chain-dotted lines in FIG. 9.

FIG. 12 is an enlarged axial sectional view of a hydraulic load sensing valve assembly adapted for use in place of the pressure control valve shown in FIG. 11.

FIG. 14 is a similar view to FIG. 13, showing a characteristic curve of the load sensing valve shown in FIG. 12.

Figure 15:
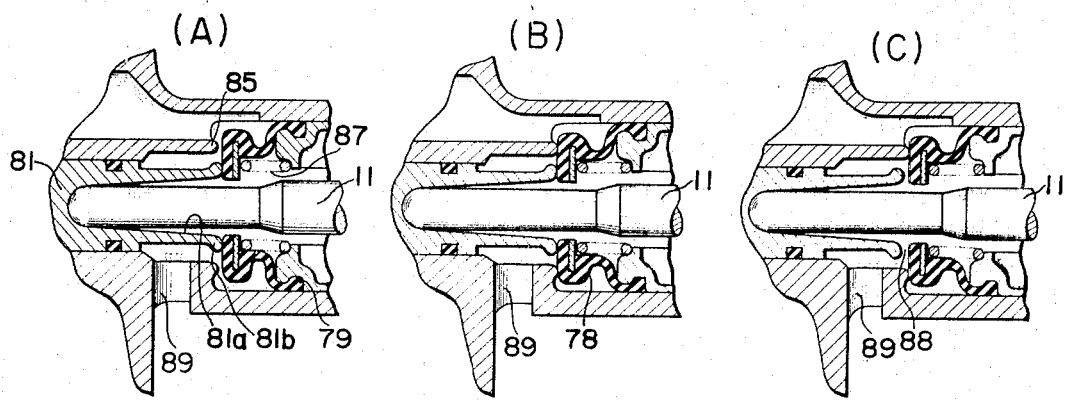

FIG. 15 at (A), (B) and (C) shows several enlarged schematic sectional views of a booster control valve fitted in the booster assembly shown in FIG. 2.

Figure 7:
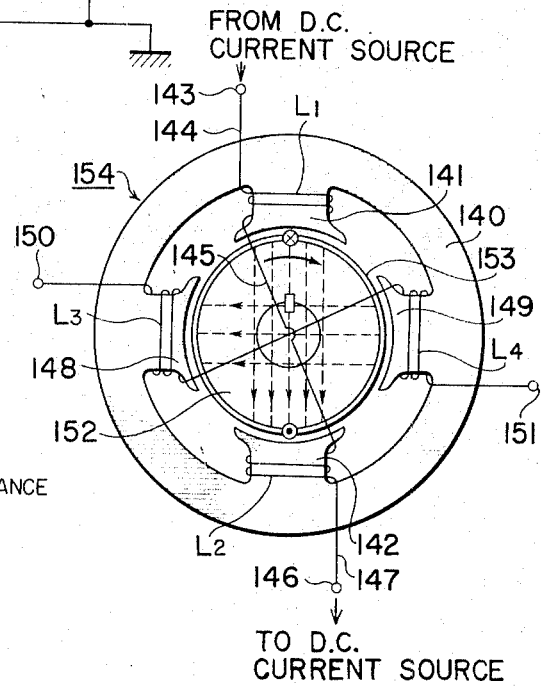
FIG. 7 is a front view of a modified main part of the skid sensor which is constructed in a modified kind of DC motor.

FIG. 16 is a schematic wiring connection of a signal processing circuit delivered from the electromagnetic skid sensor shown in FIG. 7.

Referring now to the drawings, especially FIGS. 1-7, the first embodiment of the invention will be described in detail.

In FIG. 1, numeral 10 denotes a conventional automotive foot-actuated brake pedal, one end 10a of which is pivotably mounted on a suitably selected part of the automotive chassis, not shown. A pusher rod 11 is pivotably connected at its one end to an intermediate point at 10b. There is provided a return spring 12 acting to return the foot pedal 10 from its working position shown in chain-dotted line to its off-service position shown in full line when operator's foot pressure has been released. This spring is tensioned between the chassis or the like rigid member, not shown, and said pivotable connection at 10b.

Numeral 13 denotes generally a known pneumatic booster assembly which is so arranged as conventionally to provide a boost-up operational output substantially in direct proportion to occasionally applied foot pressure by the operator on the pedal, said pressure being conveyed therefrom through said pusher rod 11 to the booster 13 in the form of its input. A conventional hydraulic master cylinder assembly generally shown at 14 is mechanically connected in tandem with the booster, as will be more fully described with reference to FIG. 3.

Figure 5:
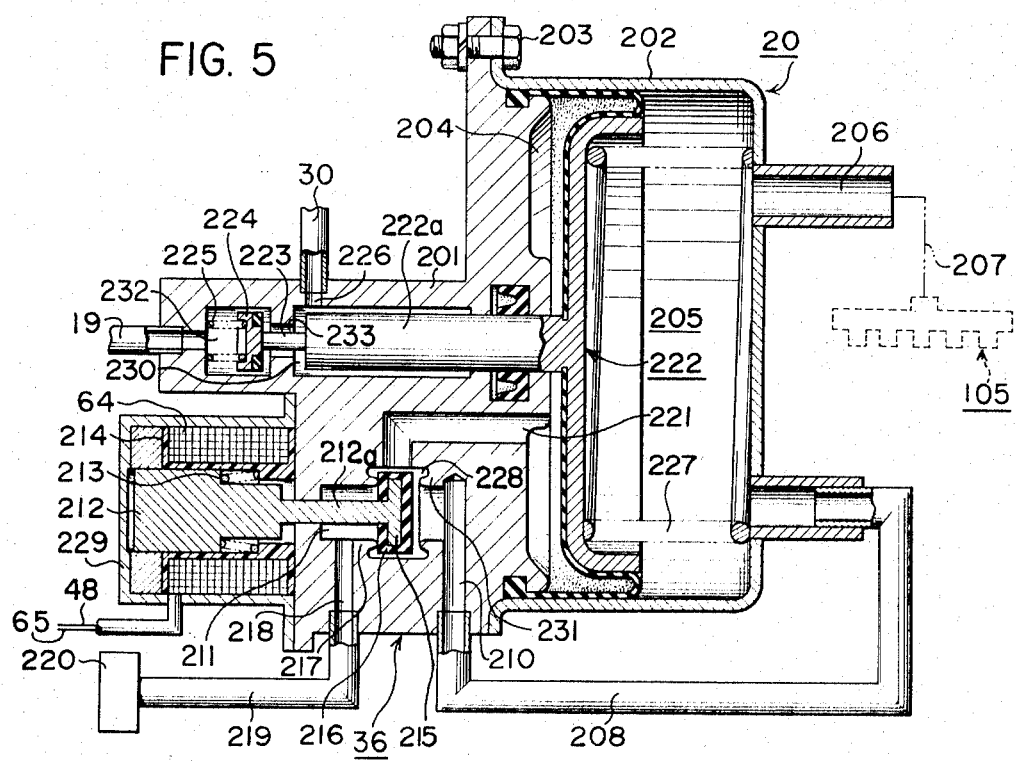
FIG. 5 is an enlarged axial sectional view of a combined hydraulic reducing valve and pneumatic and vacuum change-off valve assembly shown schematically in FIG. 1.

Master cylinder 14 is formed with two output ports 15 and 18, the former port being connected through a conduit 16 to the inlet port 17a of a hydraulic cutoff valve assembly, generally shown at 17. Another outlet port 18 of the master cylinder 14 is connected through a conduit 19 to the inlet 21 of a reducing valve assembly 20. The cutoff valve is shown more in detail in FIG. 6, while the reducing valve 20 is shown in FIG. 5. Cutoff valve assembly 17 is formed with an outlet 22 which is kept in hydraulic communication by conduit 23 with a connecting piping 24, the both ends of the latter being connected to respective wheel cylinders 27 and 28 for automotive front wheels at 25 and 26, respectively, only schematically shown in FIG. 1. Reducing valve 20 is formed with outlet port 29 which is hydraulically connected through a common conduit 30 to a connecting piping 31, the both ends of which are connected to respective wheel cylinders 34 and 35 of automotive rear wheels 32 and 33. On account of the very popularity, wheels cylinders 27 and 28, 34 and 35 are shown in a highly simplified way by respective blocks.

The assembly 20 is provided with an air change-off valve 36 which is shown in FIG. 5 more in detail.

A rectangular block 37 represents schematically a conventional automotive drive engine which is mechanically connected through reduction gearing 38 shown again only in a block, to a conventional transmission 39, the output therefrom being transmitted to a propeller shaft 40. The output end of the shaft 40 is mechanically connected to a differential gearing 41, as is conventionally done. The gearing 41 is designed and arranged to be attached to a hollow shaft 42 which houses a wheel axle 100 carrying at its both ends the rear wheels 32 and 33, respectively, for driving the latter.

Figure 4:
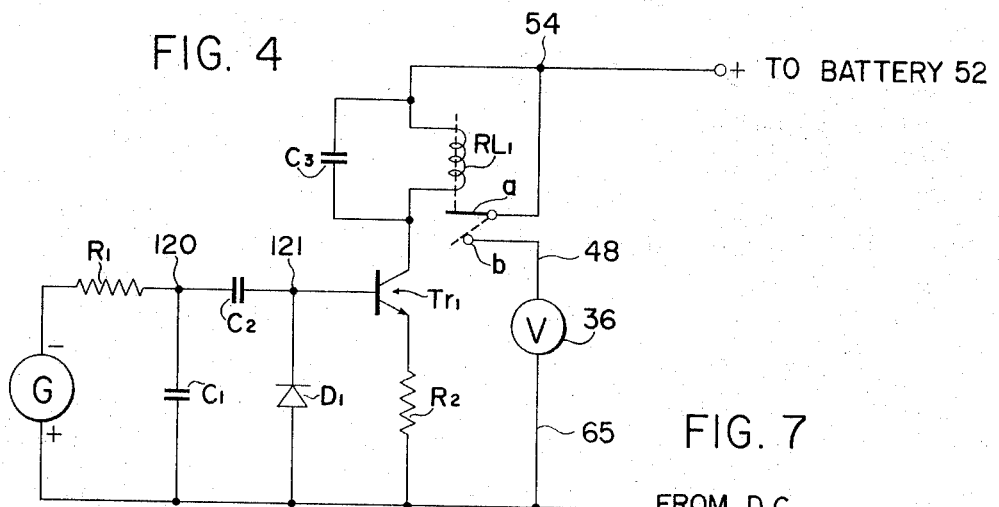
FIG. 4 is an electronic circuit constituting part of the sensor shown in FIG. 1.

The transmission 39 is provided with a sensor 43 shown in FIG. 1 in a highly simplified way by a rectangular block and in a more detailed representation in FIG. 4. This sensor is electrically connected through a lead 44 to an electronic signal processing circuit 45 which is shown in a block in FIG. 1, yet in a more specific way in FIG. 16.

The sensor 43 is designed and arranged to sense a ready-for-locking state of the rear wheels 32 and 33 when a sudden and heavy braking action is applied thereto, as will be more fully described hereinafter. Switching means 101 embodied in the electronic circuit is connected through a lead 46 to junction point 47 which is connected through lead 49 to relay coil 50 and a capacitor 51 connected in parallel thereto. The positive side of current source 52 is connected through a lead 53 including a junction point 54 to the electronic circuit 45. Junction 54 is connected through a lead 55 to switch arm 56 cooperable with stationary contact 57, said elements 55, 57 constituting a normally open switch as shown. Stationary contact 57 is connected through a lead 102 to one end of solenoid coil 58 adapted for actuation of cutoff valve 17 when energized, while the opposite end of the coil is earthed through lead 59. Switch arm 56 constitutes relay contact of relay coil 50. With the latter energized, the relay contact is brought into its closed position. A self-holding circuit 60 for the relay coil is constituted by switching elements 56, 57; relay coil 50; and capacitor 51.

One end of relay coil 50 is earthed through junction point 61 which leads to capacitor 51, and further through a lead 62. The negative side of current source 52 is earthed through a lead 63. One end of actuating coil 64 is connected through a lead 48 to junction point 47, while the opposite end of the coil is connected through a lead 65 to earth. As will be described hereinafter, the arrangement shown in FIG. 1 and its related figures is so designed and constructed that the rear wheels will be brought into an impending locked condition in advance of an impending lock condition of the front wheels.

Next, referring to FIG. 2, the design and arrangement of the constituent parts of the booster 13 will be described.

In FIG. 2, numeral 66 denotes an air intake pipe which is open at its lower end to open atmosphere and rigidly connected with a sleeve 67 by means of a part of boot-like member 68 made of an elastic substance such as rubber, said member comprising an undulating tubing 68a which is fixedly attached with its inner end to a sealing member 69 of ring shape. This member 69 is kept in relatively slidable contact with the tubular extension at 70a of a conventional power piston 70 provided with a resilient diaphragm 72 the peripheral edge of which is kept in fixed position by being positively squeezed by two confronting housing elements 71 and 73 consisting in combination, a stationary housing, generally shown at 103, of the brake booster 13. As seen, the interior space of the housing 103 is divided by the diaphragm piston into two chambers of which the right-hand side chamber 74 provides a variable pressure one, while the left-hand side chamber 75 provides a vacuum one, as will become more clear as the description proceeds. The latter chamber 75 is connected through a communication piping 104 to a suitable vacuum source 105 preferably the intake manifold of the drive engine, as schematically shown in FIGS. 2 and 5, although the source has been omitted from FIG. 1 for simplicity. There is provided a return coil spring 76 abutting between the housing wall 73 and the diaphragm piston 70.

A resilient tubular valve member 78 is fixedly attached with its outer end through tongue-and-groove connection 79 with the inner end of a cup-shaped supporting member 77 which has been pressure fit into the longitudinal bore of cylindrical piston extension 70a for performing unitary motion therewith. For assuring this unitary combination of the both, there is provided a perforated spring disc clip 80.

The pusher rod 11 extends from outside axially and horizontally into the interior of the booster assembly, the free end 11a being received in a deep recess 81a formed in a slidable valve seat member 81 mounted by the power piston 70, yet being slidable relative thereto. Valve seat member 81 is urged in the right-hand direction in FIG. 2 by the provision of an urging spring 82 through spring mount 83 which is fixedly attached to said member 81, while the opposite end of said spring abuts against the power piston. Under normal or off-service conditions of the brake system, valve member 78 is kept in pressure contact with inner valve seat at 81b formed on the member 81, as most clearly seen from FIG. 15 at (A). The left-hand end of the valve seat member 81 is telescopically received in a longitudinal bore 84a formed in the output shaft 84 of the power piston.

Outer valve seat 85 is formed directly on the power piston, as most clearly seen in FIG. 2, said seat being normally kept in a separated position from the elastic valve member 78.

The left-hand chamber 75 is kept permanently in vacuo through the connection piping 104 to the suction manifold 105 so far as the automotive engine rotates. As conventionally, the right-hand chamber 74 is also kept in vacuo through pneumatic communication with the vacuum chamber 75, as clearly understood by watching a series of small arrows showing the pneumatic communication therebetween. Therefore, the negative pressures prevailing in both chambers 74 and 75 are practically same, and thus, the power piston 70 is urged to the right-hand direction in FIG. 2 under the action of main spring 76.

When the vehicle driver pushes the brake pedal 10 inwards for actuating the brake system, pusher rod 11 is urged to move in the left-hand direction in FIG. 2 so that the valve seat member 81 is also urged to move in unison with the pusher rod. In the course of this brake actuating operation, the valve member 78 permanently being urged by an actuating spring 87 is brought into engagement with the outer valve seat 85, thereby interrupting the otherwise established pneumatic connection between both chambers 74 and 75. This operating condition corresponds to that shown in FIG. 15 at (B). With further advancement of pusher rod 11, the valve seat member 81 is moved in the same direction as before, yet being brought into separation from contact with the valve member 78, as shown in FIG. 15 at (C).

Since the atmospheric pressure coming from air intake pipe 66 and prevailing around the pusher rod as clearly understood at a glance of the right-hand part of FIG. 2, atmospheric air will flow through the now opened inside valve opening 88 between 78 and 81b and a communication passage 89 into the variable pressure chamber 74, thus power piston 70 being pneumatically urged to move leftwards in FIG. 2 against the action of main spring 76. Motion is therefore, transmitted from the power piston through its output shaft to master piston for actuating the hydraulic brake system with a boosted-up braking effort as conventionally.

It will be easily understood that all the working parts of booster assembly 13 are brought back into the normal position shown in FIG. 2, when the operator's foot pressure is released from pedal 10.

Next, referring to FIG. 3, the construction and operation of master cylinder assembly 14 will now be described.

The assembly 14 comprises a stationary cylinder 90 in which a first piston 91 and a second piston 92 are slidably and sealingly mounted. The cylinder 90 is formed integrally with an oil reservoir 99 containing a pool 110 of liquid, preferably oil.

First piston 91 is formed with end flanges 91a and 91b, a circular ring-shaped space 95 being formed therebetween and kept permanently in communication through an opening 111, bored through the cylinder wall, with the oil pool 110. Between both pistons 91 and 92, there is formed a chamber 94 which is normally kept in communication through a compensation port 112, equally bored through the cylinder wall, with said oil pool. In addition, a spring 93 is housed in the intermediate chamber 94 and abuts with its both ends against the opposing end faces of the both hydraulic pistons. The chamber 94 is permanently kept in communication with the output port 18.

Second piston 92 is formed with an end flange 92a and further with a pair of separated collars 92b and 92c. Sealing means 114, 115 and 116 are provided for effective sealing at the respective flange and collars 92a, 92b and 92c. In the similar way, the first piston 91 is also formed with sealing means 112 and 113. Around the second piston, there is formed an air chamber 96 between flange 92a and intermediate collar 92c, said chamber 96 being permanently kept in communication with ambient atmospheric air through communication passage 117 bored through the cylinder wall. Between both collars 92b and 92c, there is a hydraulic chamber 97 around the second piston 92 which is kept normally through a compensation port 118 with said oil pool 110. A stationary stop 109 is provided through the cylinder wall so as to protrude into the cylinder space for limiting the rightward movement of the second piston 92. A further compensation port 119 is bored through the cylinder wall for normal establishment of hydraulic communication between the end space 98 and the oil pool 110, said end space being formed between the left-hand end wall of the cylinder assembly and the right-hand end of second piston 92 and containing a return spring 107 abutting against the both. The output port 15 is formed through the cylinder end. A cover 108 is provided for avoiding possible invasion of foreign dust and the like particles into the inside space of the oil reservoir. The left-hand or actuating end of output shaft 84 is received under pressure in a deep conical recess 91c formed axially in the first piston, for transmitting the brake actuating effort coming from the foot pedal 10 through the booster assembly and its output shaft 84, to the first piston 91.

When the output shaft 84 of booster power piston 70 is actuated to move in the left-hand direction in FIGS. 2 and 3, as described by reference to FIG. 2 hereinbefore, the first piston 91 is moved leftwards in FIG. 3 so as to compress the spring 93 and to interrupt the hydraulic communication between movable and variable hydraulic first chamber 94 and the oil pool 110. The simultaneously compressed oil in the chamber 94 is delivered therefrom through port 18, conduit 19, inlet 21, outlet 29, piping 30, 31 to the wheel cylinders 34 and 35 for braking the rear wheels 32 and 33. At this stage, the reducing valve assembly 20 is not actuated, so far as any skidding or ready-for-skidding condition of the rear wheels is not sensed. With a small time lag from the actuation of said first piston, the second hydraulic piston 92 is moved leftwards for interruption of the hydraulic communication between chamber 98 and oil pool 110 through second compensation port 119, and then compress the oil contained therein. The thus compressed oil is delivered from the chamber 98 through outlet port 15, conduits 16 and 23 and piping 24 to front wheel cylinders 27 and 28 for braking the front wheels. At this stage, cutoff valve assembly 17 is no brought into operation when there is not indication of ready-for-skidding or actual locked condition of the front wheels.

Figure 3:
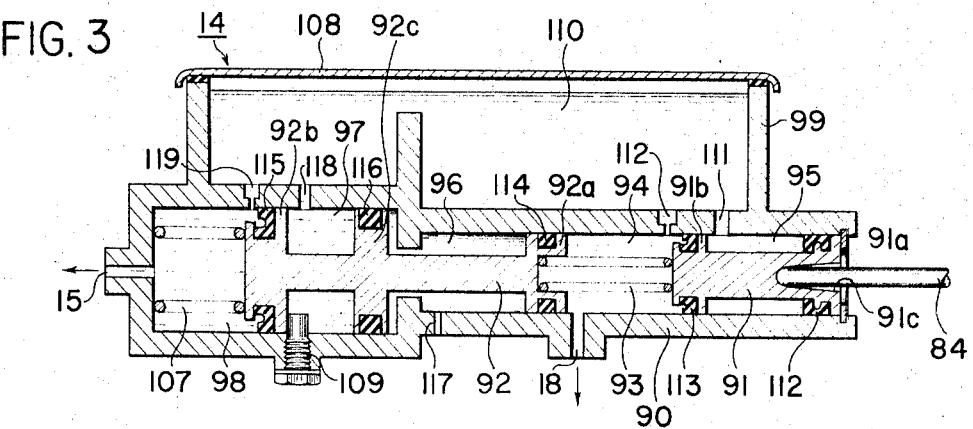
FIG. 3 is an enlarged longitudinal sectional view of a hydraulic master cylinder assembly shown schematically in FIG. 1.

It will be easily understood that when the driver's foot pressure is released from foot pedal 10, all the working parts of master cylinder assembly 14 are returned to their non-working position shown in FIG. 3.

The skid sensor shown in FIG. 1 at 43 is illustrated in more detail in FIG. 4. In FIG. 4, G denotes a conventional DC generator and its negative output terminal is connected electrically to resistor R1. C1 is a charging condenser; C2 is a differentiating capacitor; C3 a delay condenser; D1 a diode; Tr1 a transistor; R2 a resistor; V denotes an electromagnetically operating changeover valve assembly which is schematically shown at 36 in FIG. 1 and more in detail in FIG. 5; RL1 denotes a relay coil which is designed and arranged so as to control normally opened relay contacts a and b which constitutes in combination the switch 101 in FIG. 1. All these circuit elements are mutually connected as shown in FIG. 4 so that the connecting mode can be easily understood without further analysis.

The skid sensor, or more precisedly, generator G, is mechanically connected with transmission 39 so that the rotating conditions of rear wheels are sensed by the generator, although the connecting mode has been omitted from the drawings for simplicity and on account of its popularity.

Under running condition of the rear wheels 32 and 33, a negative voltage relative to the earth potential and depending upon the occasional rotational speed of the rear wheels is delivered from the negative output terminal of generator G through resistor R1 to junction point 120 leading to condensers C1 and C2.

When the brake is applied to the rear wheels, the voltage appearing at the junction 120 varies and a positive voltage will appear at junction point 121 which leads to condenser C2, diode D1 and the base electrode of transistor Tr1. This positive voltage is amplified through the transistor and the amplified current is conveyed to relay coil RL1. When a sudden and heavy braking action is applied to the rear wheels to such a degree that these wheels are brought into nearly or practical skidding conditions, the contacts a and b of relay switch 101 are thereby closed and the air changeover valve 36 is actuated so as to reduce the hydraulic pressure supplied to wheel cylinders 34 and 35, as will be more fully described by reference to FIG. 5 hereinafter. Condenser C3 provides a time lag, for instance, of 0.1–0.2 second for keeping the relay contacts closed even when the wheel speed reduction is recovered instantly.

When the rear wheel speed is recovered on account of said reduction in the hydraulic wheel cylinder pressure, the potential at junction 121 will becomes zero, and thus, the transistor Tr1 turns off.

The reducing valve assembly 20 is shown more in detail in FIG. 5. This assembly comprises a stationary housing consisting of two housing elements 201 and 202 rigidly connected together at 203. The main part of the interior space of the housing is divided into two chambers 204 and 205 by the provision of a diaphragm piston 222. Vacuum inlet socket communicating with chamber 205 is pneumatically connected through a conduit 207 to the engine suction manifold 105.

From vacuum chamber 205 extends a conduit 208 to a passage 210 kept normally in pneumatic communication with valve chamber 228 which leads through a further passage 221 to variable pressure chamber 204. Thus, under normal conditions, vacuum pressure prevails in both chambers 204 and 205. An auxiliary housing 229 is fixedly attached to main housing element 201 and houses solenoid coil 64 wound around a bobbin 214 fixedly mounted within the auxiliary housing and adapted for actuating a plunger 212. The plunger 212 has an extension 212a which is formed with a valve member 215 covered with a resilient layer 216 made of rubber or the like resilient material. The valve member 215 is designed and arranged so as to close a valve seat 217 defining one end of a space 211 formed within the main housing element 201 and communicates pneumatically with a passage 218 which leads through an inlet piping 219 and air cleaner 220 attached to the free end thereof, to the open atmosphere. Return spring 213 is tensioned between bobbin 214 and plunger 212 so as to resiliently to urge the latter to move in the left-hand direction in FIG. 5. The passage 210 is defined at its innermost end by a further valve seat 231, said valve member 215 being brought into contact with this valve seat 231 when the solenoid coil 64 is energized, said coil having electrical leads 48 and 65 which are also shown in FIG. 1.

A bore 230 is formed within main housing member 201 and receives slidably and sealingly a plunger 222a of diaphragm piston 222, said plunger being formed with a reduced extension 223. A valve chamber 232 is hydraulically connected with said bore 230 and houses movably a free valve member 224 which is normally kept in pressure engagement with the free or left-hand extremity of said reduced extension 223 under the influence of a return spring 225 housed within said valve chamber 232 from which the conduit 19 extends to output port 18 from the master cylinder 14. The conduit 30 communicates with the interior of bore 230 and there is established normally a free hydraulic communication between both conduits 19 and 30, because of the normal separation of valve member 224 from valve seat 233 adapted for on-off controlling the hydraulic communication between valve chamber 232 and bore 230, thence to conduit 30. In the vacuum chamber 205, there is provided a main or return spring 227 adapted for urging the diaphragm piston 222 towards left in FIG. 5.

Under normal or off-service conditions wherein there is no tendency for inviting skidded conditions of the rear wheel brake system, substantially equal vacuum pressures prevail in both chambers 204 and 205. Under the influence of main return spring 227, the diaphragm piston 222 is kept in the position shown in FIG. 5. Since the solenoid coil 64 is deenergized, plunger 212 is kept in the shown position, thus the valve member 215 is kept in contact with valve seat 217 under the influence of return spring 213. Therefore, atmospheric pressure supplied from ambient atmosphere through air cleaner 220 and intake conduit 219 is conveyed through passage 218 into the space 211 the extremity of which is defined by valve seat 217 which is kept in closed position, as above stated.

When the foot pedal 10 is actuated in the manner described hereinbefore, pressure oil is conveyed from the master cylinder 14 through conduit 19, valve space 232, valve seat opening 233 and bore 230 to conduit 30 which leads through the piping 31 to rear wheel cylinders 34 and 35, as was briefly described hereinbefore.

When the skid sensor 43 senses a ready-for-skidding or practically skidded condition of the rear wheels 32 and 22, current will be conveyed from DC generator G contained in the sensor 43 via now closed switch 101 to the changeover valve 36, more specifically solenoid coil 64 which is now energized. By this energization, plunger 212 advances rightwards in FIG. 5, thus valve member 215 being brought into pressure contact with valve seat 231 and thereby pneumatic communication between both chambers 204 and 205 being interrupted, while atmospheric pressure air is conveyed through the now opened valve seat 217, valve chamber 228 and passage 221 into the left-hand vacuum chamber 204. On account of the thus established pressure difference between both chambers 204 and 205, diaphragm piston 222 is urged pneumatically to move rightwards in FIG. 5, thereby plunger 222a and its extension 223 moving in unison therewith and valve member 224 closing the valve seat 233. In this way, hydraulic communication between ducts 19 and 30 is interrupted. With further advancing or righward movement of plunger 222a, the effective volume of bore 230 is increased, thus the hydraulic pressure prevailing in wheel cylinders 34 and 35 being correspondingly reduced.

When the skidding or skidded conditions of rear wheels are removed in the foregoing way and solenoid coil 64 is deenergized, all the constituent parts of the assembly shown in FIG. 5 are returned to their normal position shown therein.

Cutoff valve assembly 17 is shown in FIG. 6 more in detail. This assembly comprises a main body 123 is formed therein with a valve chamber 124 in which a valve member 126 is provided and backed up with an actuating spring 125 urging the valve member in closing direction. The valve member has a spirally grooved stem 126 slidably guided through a guide passage 127 formed horizontally in the main body 123 and abuts against a plunger 128 backed-up by a return spring 129, the opposite end of the latter abutting in turn against a stationary core piece 130. The plunger 128 is slidably guided in a sleeve 131 which is rigidly attached to the core piece 130 by press-fiting or the like conventional positioning means. Around the sleeve 131, there is mounted a bobbin 132 made of suitable plastic material and mounting a solenoid coil 58 from which leads 59 and 102 shown in FIG. 1 extend. For effective positioning the solenoid assembly 132, 58, there is provided a positioning ring 134 is inserted between the main body 123 and the core piece 130. As shown, the core assembly and the positioning ring are housed in and positioned in place by a cover member 135. The pipe 23 is hydraulically connected with the valve chamber 124 by means of a conventional pipe fitting means 136. In the similar way, the conduit 16 is connected with the up-stream part of the valve chamber in advance of valve seat member 138, by means of a conventional pipe fitting means 137. The length of valve stem 126a is so selected that under normal conditions the valve member 126 is kept in separation from the valve seat member 138 as shown.

When the relay switch 101 is closed, as was referred to hereinbefore by reference to FIG. 4, current will now flow from battery 52 through lead 53, junction 54, switch 101, lead 46, junction 47, lead 49, relay coil 50, junction 61, lead 62 to earth, thence back to the battery (see, FIG. 1). Upon energization of relay coil 50, relay contact 56 is brought into contact with stationary contact 57, thus current now flowing from the battery 52 through lead 53, junction 54, lead 55, now closed relay switch 56, 57 and lead 102 to solenoid coil 58 which is thus energized. By the energization of the coil 58, plunger 128 is attracted to core piece 130 against the action of return spring 129 and valve member 126 together with its stem 126a will follow after the movement of the plunger, thereby the valve being brought into its closed position and abutting against valve seat member 138 under the influence of its backup spring 125. Therefore, otherwise established hydraulic communication between conduits 16 and 23 is interrupted by the now closed valve member 126. Thus, the hydraulic pressure in wheel cylinders 27 and 28 provided for front wheels 25 and 26, respectively, is prevented from increasing. It will be clearly understood that when solenoid coil is again deenergized by opening of switch 101, all the constituent parts are returned to their shown position in FIG. 7.

A secondary differential signal generator adapted for sensing a possible or already realized skid condition of automotive wheel or wheels and construct a modified DC motor is illustrated in FIG. 7. This device can be replaced for the skid sensing arrangement shown in FIG. 4, when combined with an electronic circuit shown in FIG. 16.

This device comprises a stationary field yoke 140 which is formed with a diametrally opposed pair of salient poles 141 and 142 and a pair of windings L1 and L2 wound around respective poles 141 and 142. Input terminal 143 is electrically connected to the positive side of a DC current source, not shown, and one end of said winding L1 is connected to said terminal 143 by a lead 144 and the opposite end of winding L1 is connected by a conductor 145 to one end of winding L2 the opposite end of which is connected to another source terminal 146 by means of a lead 147. The winding direction of first winding L1 is same as that of second winding L2.

The field yoke 140 is further formed with a pair of salient poles 148 and 149 which are provided each at an angular shift of 90° from the neighboring pole 141 or 142. These poles 148 and 149 are provided with respective windings L3 and L4 which are wound in the same direction as before relative to each other and connected electrically with each other, on the one hand, and to respective output terminals 150 and 151 in the similar mode to that of former windings L1 and L2 which act as energizing coils, while windings L3 and L4 act as sensing coils, as will become more clear as the description proceeds.

At the center of the yoke 140, there is provided a rotor 152 made of a suitable magnetizable material such as iron and operatively and mechanically connected with propeller shaft 40 or the rear wheel axle 100 or the like, as will be easily supposed and thus not shown. The outer cylindrical surface or rotor 152 is covered by conductor means 153 fixedly attached thereto, although the fixing means have been omitted from the drawing only for simplicity.

When the vehicle is and thus its rear wheels are stopped and a DC current is conveyed through series energizing coils L1 and L2, magnetic fluxes emanate from first pole 141 through the rotor 152 toward the opposite pole 142.

When the rotor begins to rotate as shown by the full lined arrow, the part of conductor 153 which is positioned opposite to first pole 141 is induced with a current directing away from the viewer and perpendicular to the drawing paper, while in the part of the same conductor 153 which is positioned opposite to second pole 142, a current is induced which directs towards the viewer and perpendicular to the drawing paper.

The voltage induced in the conductor 153 is directly proportional to the rotational speed of the rotor and thus a primary differential of the rotor speed. This induced current will generate magnetic fluxes which direct from the pole 149 towards the opposite pole 148, thus cross-linking the coils L4 and L3. So far as the rotational speed of the rotor remains constant, the induced voltage in conductor 153 is also constant and the density of the fluxes generated by the voltage will remain constant. So far as the rotor rotates at a constant speed, no voltage will appear at output terminals 150 and 151.

On the contrary, when the rotational speed of rotor 152 is changed suddenly and substantially, the voltage induced in the conductor will vary abruptly, thus a potential difference appears between the output terminals and said difference representing a kind of secondary differential. The thus developed voltage has naturally the positive or negative sign, depending upon whether the speed change is accelerating or decelerating, as the case may be. Therefore, it will be seen that with the rotor subjected acceleration or deceleration, a positive or negative voltage appears in the sensing coil means.

The electronic circuit shown in FIG. 16 serves as a wheel skid control means which comprises amplifier circuit I, minimum signal level setting circuit II, delay circuit III, temporary brake release signal circuit IV and constant voltage source circuit V, as shown by several dotted line blocks.

When a deceleration should happen to take place in the rotational movement of rear wheels 32 and 33 to such a degree that these wheels are about to skid or even brought into a skidded condition, the control circuit will act to reduce or even to release the braking force applied to the rear wheels.

One of the output terminals at 151 of the modified motor 154 shown in FIG. 7 is connected electrically through condenser C12 with the base electrode of transistor T1, while another output terminal 150 is connected to a source voltage line 155. Transistor T1 is biased by several resistors R11, R12, R13 and R14 so as to amplify only the deceleration signal sensed by sensing coils L3 and L4. Condenser C11 connected in parallel thereto acts as a filter which suppresses minor deceleration signals occasionally developed by rotational fluctuations of the rotor 152 or minor speed changes in running of the automotive rear wheels from being amplified by the amplifier circuit I.

The deceleration signal amplified at transistor T1 is is applied through resistor R15 to the base electrode of transistor T2, fitted with resistors R16 and R17, thereby being further amplified. The thus amplified signal is then fed from the collector electrode of transistor T2 trough a coupling condenser C13 to the minimum signal level setting circuit II. This second circuit constitutes a kind of Schmidt circuit comprising transistors T3 and T4, resistors R18–R25 and condenser C14. Under normal conditions, transistor T3 is off, while transistor T4 is on. When a deceleration signal which is higher than a predetermined value is applied to transistor T3, the latter turns on, while transistor T4 turns off. These operating conditions are maintained so far as the applied signal remains higher than the set level. This pulse signal is conveyed from collector electrode of transistor T4 through diode D11 to the third or delay circuit III which contains transistors T5 and T6, resistors R26–R31, condensers C15 and C16 and constitutes a monostable multivibrator. Under normal conditions, transistor T5 is off, while transistor T6 is on.

So far as the deceleration voltage higher than the set signal level is applied, transistor T4 turns off, while the collector potential of transistor T4 remains equal to earth one and the collector potential transistor T5 approaches gradually to earth potential. By this reason, transistor T5 turns from off to on, while transistor T6 will turn from on to off. These switched conditions will remain unchanged during the time interval which depends upon the time constant provided by the combination of condenser C15 with resistor R28. The output signal delivered from this delay circuit is conveyed from the collector electrode of transistor T6 through the resistor R32 to the fourth circuit or brake release signal circuit IV.

Transistors T7 and T8 constitute in combination a pulse signal amplifier circuit adapted for amplifying the fed signal from the foregoing delay circuit. When the transistor T6 turns from on to off, the collector potential will be lowered and the transistor T7 will turn on. In this way, the emitter side potential at resistor R13 will be lowered. When the base potential at transistor T8 is lowered, transistor T8 will turn on.

By this operation, the base potential at the switching transistor T9 will increase and that transistor turns on. Therefore, valve control coil 64' connected in series between the collector electrode of transistor T9 and source voltage line 155 is fed with current, and at the same time skid alarm lamp L connected in parallel with said coil 64' will be ignited, the diode at D12 connected in parallel with said coil 64' serves for avoiding transistor T9 from being affected by the reversed electromotive force provided by said coil 64' which is similar to that shown in FIG. 1 in its general arrangement and function.

The fifth or constant voltage source circuit V is so designed and arranged to meet with possible variation in the source voltage of battery at 156, so as to assure a highly stabilized operation of the electronic control circuit shown in FIG. 16.

As commonly known, the automotive accumulator battery is always charged by an alternator fitted on the automotive vehicle, and therefore the source voltage delivered from the battery contains more or less riples. The battery voltage will vary depending upon the occasional electrical load fluctuation on board of the vehicle. In the present embodiment, the more or less variable DC voltage is stabilized by the provision of chalk coil L14 and condenser C17. In the similar way, the output signal is conveyed to solenoid coils 64 and 58, and so on.

Figure 8:
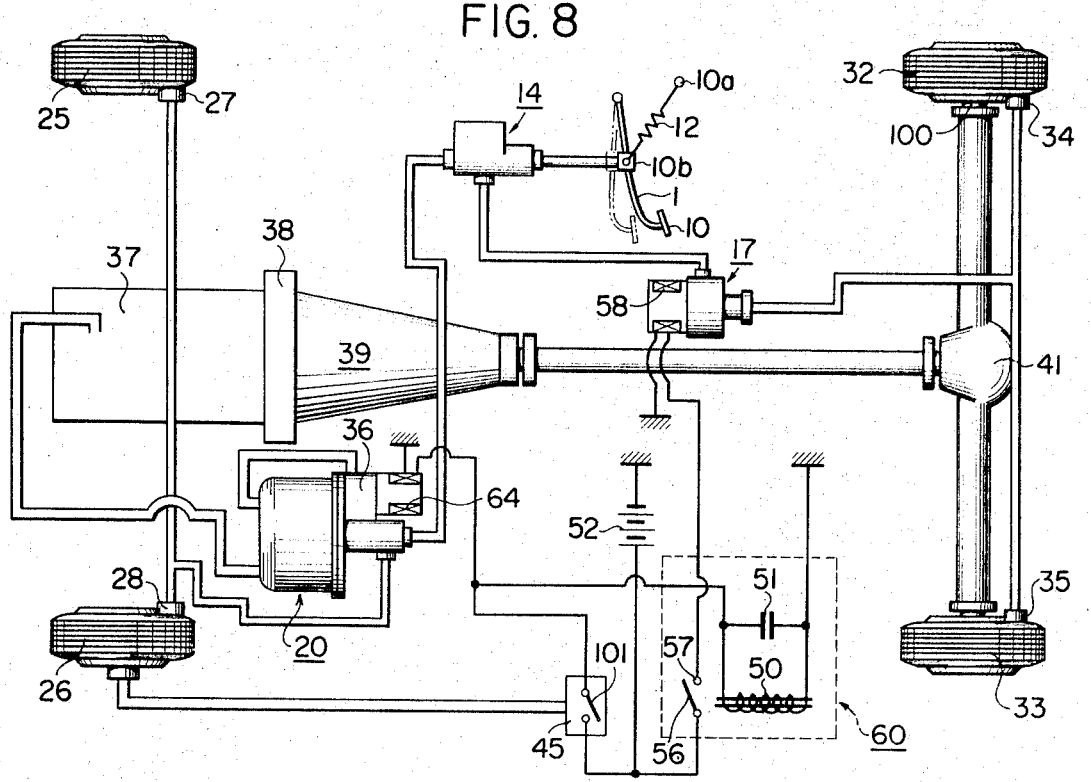
FIG. 8 is a similar view to FIG. 1, illustrating a slight modification from the first embodiment.

In the second embodiment shown in FIG. 8, same or similar constituent parts as those employed in the first embodiment are denoted with same respective reference numerals or symbols for easy comparison and better understanding of the invention. As seen, the overall antiskid type brake system is so designed and arranged that the front wheel pair 25, 26 is arranged to be brought into an impending locked condition before the rear wheel pair 32, 33.

Figure 9:
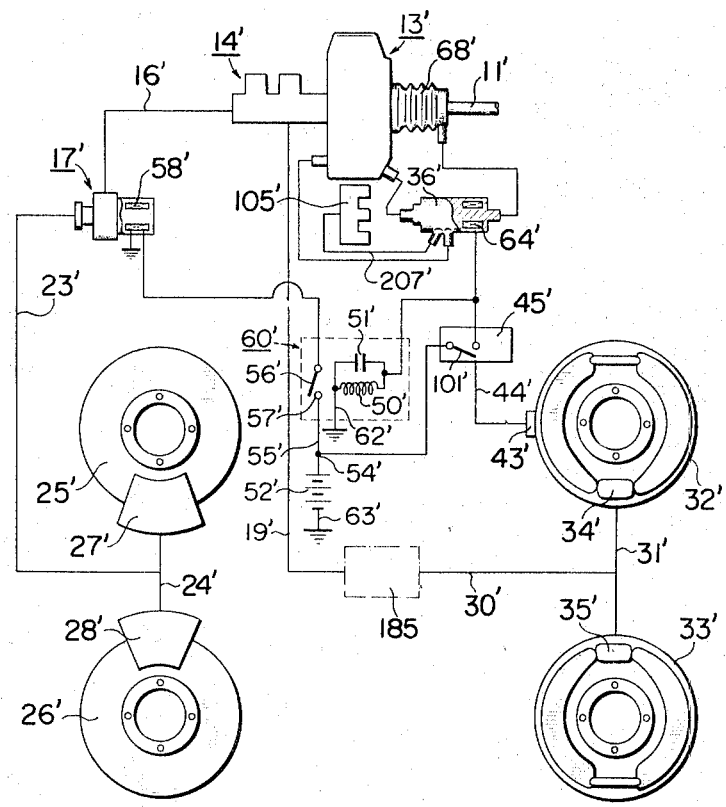
FIG. 9 is a further similar view to FIG. 1, illustrating however a second embodiment of the invention.

In the third arrangement known in FIG. 9, same or similar constituent parts as before are denoted with same reference numerals and symbols, yet attached each with a single prime for easy comparison and better understanding of the present invention.

The main difference between the first and the third embodiments resides substantially in that in the latter, the power piston of brake booster 13' is utilized simultaneously as the similar piston employed in the reducing valve assembly 20, FIG. 1. The master cylinder 14' is just same as shown in detail in FIG. 3.

Figure 10:
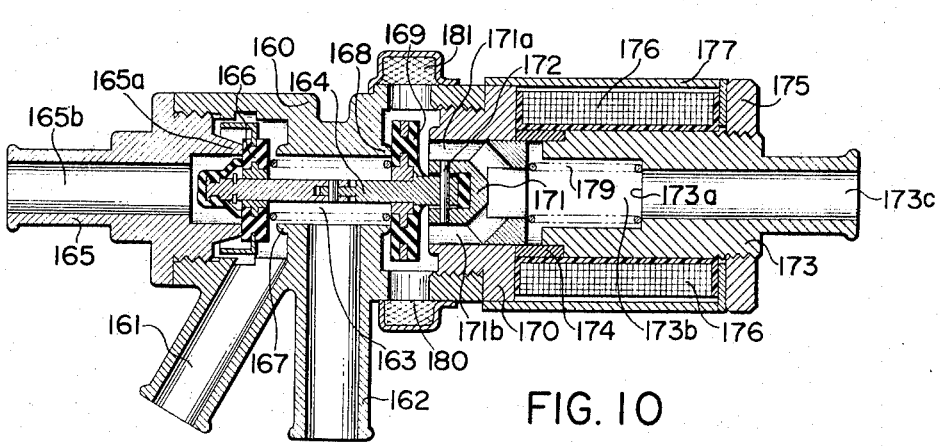
FIG. 10 is a longitudinal sectional view of a pneumatic and vacuum change-off valve assembly shown schematically in FIG. 9.

The air change-off valve assembly 36' is shown in detail in FIG. 10.

In this assembly 36', there is provided a stationary main part 160 which is formed with vacuum inlet 161 pneumatically connected with an engine section manifold such as shown at 105 in FIG. 2. An outlet 162 is made integral with the main body part 160 and leads to inlet part 104 of the pneumatic booster assembly 13 shown in FIG. 2. Inlet 161 and outlet 162 are normally kept in pneumatic communication through valve chamber 163 when a slidable twin valve member 164 is positioned as shown in FIG. 10. An outlet piece 165 is screwed into the main body part 160 and formed at its innermost end with a valve seat 165a which is normally closed by the first valve element 166 so that otherwise established communication between outlet bore 165b formed through said piece 165, on the one hand, and the outlet 162 through valve chamber 163, on the other hand, is positively interrupted. There are further two valve seats 167 and 168 of which the latter is closed normally by the second valve element 169 of the twin valve member. A bored intermediate body part 170 is screwed to main body part 160 adapted for slidable guidance of a perforated plunger 171 which is linkedly connected at 172 with the inner end of the twin valve member 164. To the intermediate body part 170, a hollow member 173 is fixedly attached through connecting bushing 174 and positioning nut 175. Around bushing 174 and hollow member 172, a solenoid coil 176 is wound and positioned rigidly by tightening said nut 175. The required positioning in this respect is further assured by the provision of a cylindrical cover 177 which houses substantial part of said solenoid coil 176.

The port 165b is connected pneumatically through a suitable piping to inlet socket 178 shown in FIG. 2. Socket 178 kept in pneumatic communication with the interior of the variable pressure chamber 74 is pneumatically connected in turn with port 165.

The axial bore of the hollow member 173 is formed with an inside shoulder at 173a and the left-hand enlarged bore space 173b containing a return spring 179 which urges the combined assembly of plunger 171 and twin valve member 164 towards left in FIG. 10.

Main body part 160 is formed with an air port 180 which communicates through air cleaner 181 with ambient atmosphere, on the one hand, and is kept in communication with passage 171a of plunger 171, on the other hand.

When an output signal is delivered from the skid sensor 43' through signal processing circuit 45' to solenoid coil 176, plunger 171 together with dual valve member 164 is moved rightwards in FIG. 10 against the action of return spring 179, valve elements 166 and 169 are brought into pressure contact with other side valve seat 167, and seat 171a on plunger 171, respectively. Thus, the outlet 162 is brought into communication through valve chamber 163, air port 180 and cleaner 181 with the atmosphere. This introduced atmospheric air is supplied through inlet socket 104 to the chamber 75 (FIG. 2).

With the aforementioned shift of first valve member 166, the valve seat 165a is opened so that vacuum pressure is conveyed from inlet 161 to outlet 165b, thence through inlet socket 178 into the related chamber 74.

With the effective cooperation of second valve element 169 with valve seat 171a, pneumatic communication between air ports 180 and 173c is interrupted, and therefore no atmospheric air is supplied to inlet port 66, FIG. 2. Therefore, the pressure conditions of both chambers 74 and 75 are changed. More specifically, the normally vacuum chamber 75 accumulates now atmospheric pressure, while the variable pressure chamber 74 is kept in vacuo. The relative pressure conditions between both chambers 74 and 75 are therefore reversed to those under the normal conditions, and thus power piston 70 is forced backwards or more precisely rightwards in FIG. 2 against the foot pedal pressure exerted by the vehicle driver intending to actuate the brake. This operation leads to lower the hydraulic brake pressure to the rear wheels, thus preventing a wheel skid.

When the skid impending condition at the rear wheels is thus removed and the skid sensor does not deliver any output signal, the solenoid coil 176 is deenergized and all the working parts of the air pressure change-off device, FIG. 10, are returned back to their normal position shown.

The optionally employable brake or wheel cylinder pressure control device schematically shown at 185 in phantom lines is shown in FIG. 11 more in detail.

This device 185 comprises a hollow cylinder 186 having an open end 186a is tightly closed by a closure member 187 through intermediary of sealing means 188 by means of conventional fixing means such as screw connection shown at 189.

A piston consisting of a larger piston element 190a and a smaller piston element 190b is sealingly and reciprocably mounted within the interior space of said cylinder 186, the sealing means adapted for this purpose being shown at 191 and 192. An oil chamber 193 containing a return spring 194 is defined by the cylinder wall and the smaller piston 190b, said chamber being kept in hydraulic communication through conduit 195 and connecting piping 19' (see, also FIG. 9) with a proper output port of master cylinder 14' which port may be similar to that shown at 18 in FIG. 1.

A further oil chamber 196 is defined by the cylinder wall, large piston element 190a and closure member 187, said chamber 196 being kept in hydraulic communication through pipings 3040 and 31' to the rear wheel cylinders 34' and 35' which may be similar to those at 34 and 35 shown in FIG. 1.

A valve chamber 197 is formed in the body of closure member 187 and contains substantial part of valve member 199 backed up by a return spring 240, said chamber 197 being kept in hydraulic communication with the junction at 241 between pipings 195 and 19'. Valve seat member 242 is mounted fixedly in the closure member, said valve member being kept in physical separation from the valve seat member as shown.

In all the foregoing three embodiments, a selected pair of vehicle wheels, preferably rear wheels (except in the case of the arrangement shown in FIG. 8), is arranged to be brought into an impending locked condition before the remaining vehicle wheels, preferably front wheels. For this purpose, various measures can be adopted. In the first embodiment, this is realized by adopting two different diameter pistons 91b and 92b. With smaller piston 91b, high hydraulic pressure is delivered from port 18 of master cylinder toward rear wheel brake cylinders 34 and 35. With larger piston 92b, low hydraulic pressure is delivered from port 15 toward front wheel brake cylinders 27 and 28. For the similar purpose, the brake cylinder pistons for vehicle rear wheels can be increased relative to those for front vehicle wheels.

The pressure control valve assembly 185 shown in FIG. 11 well serves for the same purpose.

In the operation of the pressure control assembly shown in FIG. 11, when the foot brake pedal similar to that denoted 10 in FIG. 1 is depressed, hydraulic master cylinder pressure is conveyed through piping 19' and conduit 198, valve chamber 197 and valve opening 242a into the cylinder space 196 directly before the pressure receiving surface of larger piston element 190a. In the similar way, the same hydraulic pressure is conveyed through piping 19' and conduit 195 into hydraulic chamber 193. On account of the difference in diametral dimensions of both larger and smaller pistons, the piston will be hydraulically urged to move leftwards in FIG. 11, thus compressing the return spring 194 and simultaneously closing the valve opening 242a by valve member 199. Thus, the hydraulic pressure prevailing in the chamber 196 will start to reduce. When the thus accumulated energy in the spring plus the hydraulic pressure multiplied by the small piston area exceeds the thus reducing hydraulic pressure multiplied by the large piston area, the piston will move in the reverse direction or more specifically rightwards in FIG. 11, and thus the valve 199 reopens the valve opening 242a so that the hydraulic pressure prevailing the larger piston chamber 196 will soon recover the line or master cylinder pressure, and so on. In this way, the hydraulic piston will perform a reciprocating movement with a certain higher frequency.

Figure 13:
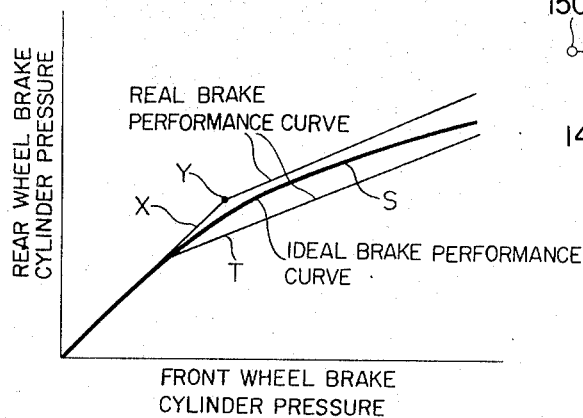
FIG. 13 is a characteristic curve of the pressure control valve shown in FIG. 11 and expressed in terms of the rear wheel hydraulic cylinder pressure plotted against that for the front wheels.

In practice, however, the piston reciprocating movement is not brought about at lower master cylinder pressures. In FIG. 13, a 45° inclined straight line X is plotted. With lower master pressures below that corresponding to a predetermined point Y on the line which point is determined by the piston area difference, front and rear wheel brake cylinders are supplied with equal hydraulic pressures. When the point Y is reached and the master pressure exceeds the corresponding predetermined value, the curve will travel along that denoted with Z. In practice, this curve Z consists of that representing a infinitely numerous minor undulations caused by the piston reciprocations. The curve S represents an ideal performance curve. When the practical curve lies above this ideal curve, the rear wheels will be brought into an impending skidding condition before the front wheels and are more liable to lock than the front wheels. On the contrary, when the practical curve such as at T lies below the ideal curve, the skidding may be more liable to occur at the front wheels than the rear wheels in the present embodiment. The curve X–Y–Z is naturally caused to take place with a sudden and heavy braking operation at foot pedal 10.

In the case of automotive trucks, however, a sudden braking may frequently invite a positional shift of the loaded baggages or the like. And thus, same braking effort may vary with increased or reduced hydraulic brake pressure. Therefore, it is preferable to control the hydraulic brake pressure depending to lesser or more degree of such load shift.

Finally referring to FIGS. 12 and 14, a load-sensing brake pressure control assembly 243 which can be positioned at 185 in FIG. 9 is illustrated in detail.

With this assembly 243, its upper hinge connection 244 is attached to the vehicle chassis, partially shown at 245, in close proximity to the its regular suspension spring, not shown. A strong tension spring 246 is tensioned between a channel 247 formed on the lower end of the assembly, and to the axle shaft such as at 100 in FIG. 1 by means of a proper conventional attaching means such as bolt and nut at 248 in FIG. 12.

The main body of the assembly 243 comprises a main cylinder 249 and a hollow sleeve 250 fixedly screwed to the lower end thereof. At the lower end of the sleeve, there is provided a perforated closing cap 251 fixedly attached thereto. Within the interior space of the cylinder, a differential piston 252 having a large piston element 252a and a small piston element 252b, a ring-shaped chamber 253 being formed therebetween and kept in hydraulic communication through a port 254 with the master cylinder. A head plug 255 is attached by screwing to the upper end of said cylinder 249, on the one hand, and mechanically connected to the hinge 244, on the other hand. A hydraulic chamber 256 is formed between the lower end of head plug 255 and the upper or pressure-receiving surface of larger piston element 252a, said chamber 256 being hydraulically communicated with a valve 257 and its housing space or valve chamber 258. Chamber 256 is connected with the rear brakes through a passage 259 and a port 260. A bleed fitting 260 is attached to the upper end of head plug 255 and communicated with chamber 258 through passage 259'. As seen, said valve, valve chamber and passage are contained or housed in the head plug. The upper ball end 261a of adjuster rod 261 is mechanically connected with the lower end of said differential piston, said rod passing through said sleeve 250 and cap 251 and screwed into an adjustable nut 262 which is formed with the spring-receiving channel 247. A strong compression spring 263 is housed in the sleeve 250 as shown.

It will be clearly understood that with increased loading, the distance between the upper and lower ends of the shown device will be shortened and the compression degree of spring 263 is correspondingly accentuated, and vice versa. The length of tension spring 246 will be naturally reduced in this case. The spring force of the compression spring 263 is so adjusted to provide specific oil pressure characteristic curves W1 and W2 and the like which are very close to the ideal curve S1. The upper curve W1 corresponds to a certain high load, while the lower curve W2 corresponds to a certain low load. The adjustment of the spring in this embodiment is such that an impending locked condition will be brought about in the rear wheels before an impending locked condition in the front vehicle wheels when subjected to heavy braking.

When heavier braking pressure is applied to the foot-operated brake pedal, pressure oil is conveyed from master cylinder through a piping and the port 254 to chamber 253, thence through passages 264–266 and valve chamber 258 to piston chamber 256. In the similar way as was described by reference to FIG. 11, the differential piston 252 will perform a frequently and rapidly repeated reciprocating movement depending upon the differential piston area, the amount of the carried load on the vehicle and the degree of deceleration of the vehicle caused by the application of the braking effort and thus the occasional conditions of both springs 246 and 263.

Therefore, in this case, the closing and reopening frequency of the valve 257 depends upon the above mentioned several parameters.

In this way, the passage of hydraulic liquid pressure coming from the master cylinder and through the valved passage 266, passage 259 and port fitting 260, to the rear wheel brake cylinders such as 34 and 35, or 34' and 35' in FIG. 9 can be controlled depending upon the occasionally loaded conditions of the vehicle.

Although several features have been separately described in the foregoing several specific embodiments, it will be stressedly understood that aforementioned separate constructional features in a certain embodiment may be well combined with other features shown and described in any of other embodiments in the foregoing.

In practice, however, the rear wheels may be locked only for a short time interval even when using the arrangement embodying the principles of the invention. Such a phenomenon may be tolerated when the skidded conditions extend for a highly limited time period.

What we claim is:

1. An automotive brake system for a vehicle having at least two pairs of running wheels, each wheel of said running wheel pairs including a brake assembly having a hydraulic actuating cylinder, a hydraulic pressure supply means for actuating said wheel brake assemblies, a first conduit means communicating said pressure supply means to the brakes of one of said wheel pairs, a second conduit means communicating said hydraulic pressure supply means with the brakes of the other of said wheel pairs, means for bringing about an impending locked condition in the other of said wheel pairs prior to bringing about an impending locked condition in said one of said wheel pairs, skid sensing means operatively connected with said other of said wheel pairs for creating a signal in response to sensing an impending skidding condition of said other of said wheel pairs, cutoff valve means connected in said first conduit means for blocking the flow of hydraulic pressure applied by said first conduit means for blocking the flow of hydraulic pressure applied by said hydraulic pressure supply means to said one of said wheel pairs, reducing valve means connected in said second conduit means for interrupting the flow of hydraulic pressure from said hydraulic pressure supply means to said other of said wheel pairs and increasing the volume of said conduit to reduce the pressure applied to said other wheel pairs, and control means interconnecting said skid sensing means with said cutoff valve means and said reducing valve means for actuating said cutoff valve means to maintain the hydraulic pressure at said one of said wheel pairs and simultaneously actuating said reducing valve means to allow a decrease in the hydraulic pressure applied to said other of said wheel pairs upon the sensing of an impending skid condition by said skid sensing means, whereby the hydraulic pressure applied to said other of said wheel pairs is reduced while the pressure applied to said one of said wheel pairs is maintained to allow said other of said wheel pairs to rotate while maintaining a constant braking effect on the wheels of said one of said wheel pairs.

2. An automotive brake system as claimed in claim 1, wherein said hydraulic pressure cutoff means located in said first conduit means between said hydraulic pressure supply means and said one of said wheel pairs is comprised of a valve body, a first hydraulic passage connected between said hydraulic pressure supply means and said valve body, a second hydraulic passage connected between said valve body and said wheel brake cylinders, a chamber in said valve body connecting said first and second passages, a valve member and said second passage to urge said valve member in a closing direction, an electric solenoid assembly, including a plunger, located on that end of said valve body that is opposite to said second passage, a reciprocating stem slidably guided between said valve member and said plunger of said electric solenoid, a spring for urging said plunger, said stem, and said valve member in an open direction, whereby when said electric solenoid is actuated by said control means, said plunger will move against the force of said spring urging said valve means in the open direction, thereby allowing said valve member to move to the closed position and cut off the flow of hydraulic fluid from said hydraulic pressure supply means to said wheel brake cylinders to prevent a further increase in the pressure applied to the wheel brake cylinders of said first wheel pair.

3. An automotive brake system as claimed in claim 1, wherein said reducing valve means comprises, an incoming hydraulic conduit connected to said hydraulic pressure supply means, an outlet conduit connected to the wheel brake cylinders of said other of said wheel pairs, a passage connecting said inlet conduit and said outlet conduit, a valve means located in said passage for selectively blocking communication of said inlet passage with said outlet passage, a plunger movably positioned in said chamber between said valve means and the wheel brake cylinders of said other of said wheel pairs for varying the volume of said passage, a pneumatic servo motor means operatively connected with said valve means and said plunger, said servo motor means having a sealed cavity therein, a diaphragm piston dividing said cavity into a first and a second sealed chamber, said diaphragm piston being operatively connected with said plunger and said valve means, a first pneumatic conduit means for pneumatically communicating said first and second chambers with each other, a second pneumatic conduit means communicating said second sealed chamber with a source of pneumatic vacuum, and a change-off valve means connected in said first pneumatic conduit means, said change-off valve having a first position for communicating said first chamber with said second chamber and a second position for blocking said first pneumatic conduit means and communicating said first chamber with the ambient atmosphere, said change-off valve being actuated by said control means upon the sensing of a skid condition by said skid-sensing means to block the communication of said first chamber with said second chamber and introduce ambient atmospheric air into said first chamber to actuate said valve means to block the flow of hydraulic pressure from said hydraulic pressure supply means to said wheel brake cylinders and increase the volume between said valve means and said wheel brake cylinders, whereby the wheel brake actuating pressure is reduced to allow rotation of the wheels of said other wheel pair.

4. An automotive brake system as claimed in claim 1, further comprising, a pneumatic booster assembly operatively connected with said hydraulic pressure supply means to provide a power assist therefor, said pneumatic booster assembly including a sealed cavity therein, said cavity divided into a first and a second chamber by a diaphragm piston means, said diaphragm piston being operatively connected with said hydraulic pressure supply means for the actuation thereof, said first chamber being connected with a source of vacuum, a first pneumatic conduit communicating said chamber with said second chamber, and an air change-off valve means connected in said second pneumatic conduit means, said change-off valve having a first position and a second position, said first position for communicating said first chamber of said pneumatic booster with said vacuum source and said second position for communicating ambient atmosphere to said first chamber and connecting said second chamber with said vacuum source, said change-off valve means being actuated by said control means in response to a sensed skid condition by said skid-sensing means, whereby said cut-off valve is actuated and said air change-off valve causes said pneumatic booster to decrease the amount of hydraulic pressure supplied to the brakes of said other wheel pairs by said hydraulic pressure supply means to allow said wheels of said other wheel pair to rotate.

5. An automotive brake system as claimed in claim 1 further comprising a pressure control valve means, said pressure control valve means connected in said second conduit means, said pressure control valve means including a housing having a stepped bore therein, a stepped piston slidably positioned in said stepped bore, said stepped piston having a smaller diameter portion communicating with said hydraulic pressure supply means and a larger piston portion communicating with the actuating cylinders of said other of said wheel pairs, a conduit communicating said smaller diameter portion of said stepped piston with said larger diameter portion thereof, a valve means located in said interconnecting conduit and operatively connected with said stepped piston, a biasing means for biasing said valve means in an open position, whereby, when hydraulic pressure is applied by said hydraulic pressure supply means, said stepped piston is caused to reciprocate to allow the pressure supplied to the wheel brake assemblies of said other of said wheel pairs to increase step-wise.

6. An automotive brake system as claimed in claim 1, further comprising a load sensing valve means connected in said second conduit means, said load sensing valve means including a stepped piston slidably positioned in a cylinder said stepped piston having a smaller diameter portion and a larger diameter portion formed thereon, an interconnecting conduit communicating the portion of said cylinder containing said larger diameter portion of said piston with the cylinder portion containing the smaller diameter portion of said piston, said smaller diameter portion of said piston communicating with said hydraulic pressure supply means, a valve means located in said interconnecting passage and operatively connected with said piston assembly to selectively block communication of said smaller diameter piston portion with said larger diameter piston portion, a first biasing means for biasing said valve means in an open position, said load sensing valve means being connected between a load supporting sprung portion and an unsprung portion of a vehicle through a second biasing means, said second biasing means acting in opposition to said first biasing means, whereby, as the vehicle loads increase, said first biasing means moves said valve means towards its open position, thereby allowing reciprocable movement of said stepped piston to cause the hydraulic pressure applied to the wheel brakes of the other of said wheel pairs to increase step-wise as the vehicle load is increased.

7. An automotive brake system as claimed in claim 1, said control means comprising a self-holding circuit means including a sloenoid and a switching means, said solenoid being operatively connected with said skid sensing means to hold said switching means in a closed position during operation of said sensing means, said switching means operatively connected with said cut-off valve means to control the actuation thereof, and further including a second switching means for controlling the operation of said solenoid, said second switching means actuated in response to a signal created by said skid means.

8. An automotive brake system as claimed in claim 1, wherein said skid sensing means comprises, a direct current generator having an armature operatively connected to said other wheel pairs and having the winding of a field yoke connected to said control means for actuating said control means when said generator ceases to generate an electric current when said other wheel pairs are locked in a skid condition.

* * * * *